(No Model.)

H. C. IVES.
TOY TEAM OF HORSES.

No. 564,789. Patented July 28, 1896.

WITNESSES
H. A. Laird
S. V. Richardson

INVENTOR
Harry C. Ives
By A. M. Wooster
Atty.

UNITED STATES PATENT OFFICE.

HARRY C. IVES, OF BRIDGEPORT, CONNECTICUT.

TOY TEAM OF HORSES.

SPECIFICATION forming part of Letters Patent No. 564,789, dated July 28, 1896.

Application filed February 4, 1896. Serial No. 578,013. (No model.)

*To all whom it may concern:*

Be it known that I, HARRY C. IVES, a citizen of the United States, residing at Bridgeport, in the county of Fairfield and State of Connecticut, have invented certain new and useful Improvements in Toy Teams of Horses; and I do hereby declare the following to be a full, clear, and exact description of the invention, such as will enable others skilled in the art to which it appertains to make and use the same.

My invention has for its object to produce a toy vehicle and pair of draft-animals so constructed as to permit the animals to be independently placed in position and to be attached to the pole of the vehicle and detached therefrom in a manner closely resembling the "hitching up" of a team of horses, the operation being so simple that it can be readily performed by a child, the toy as a whole being inexpensive to produce and neat, strong, and durable. With these ends in view I have devised the novel toy of which the following description, in connection with the accompanying drawings, is a specification, numerals being used to designate the several parts.

Figure 1:
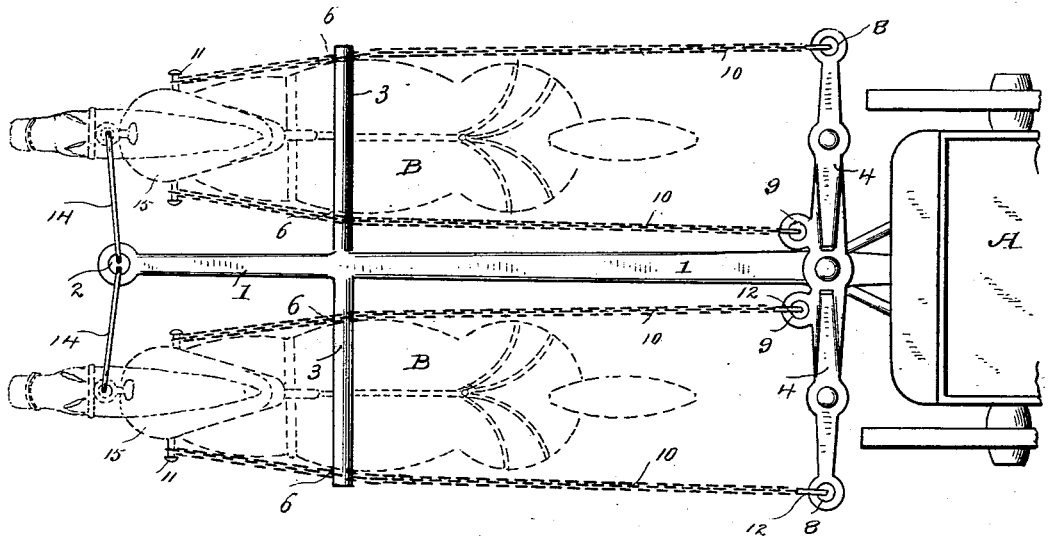
Figure 2:
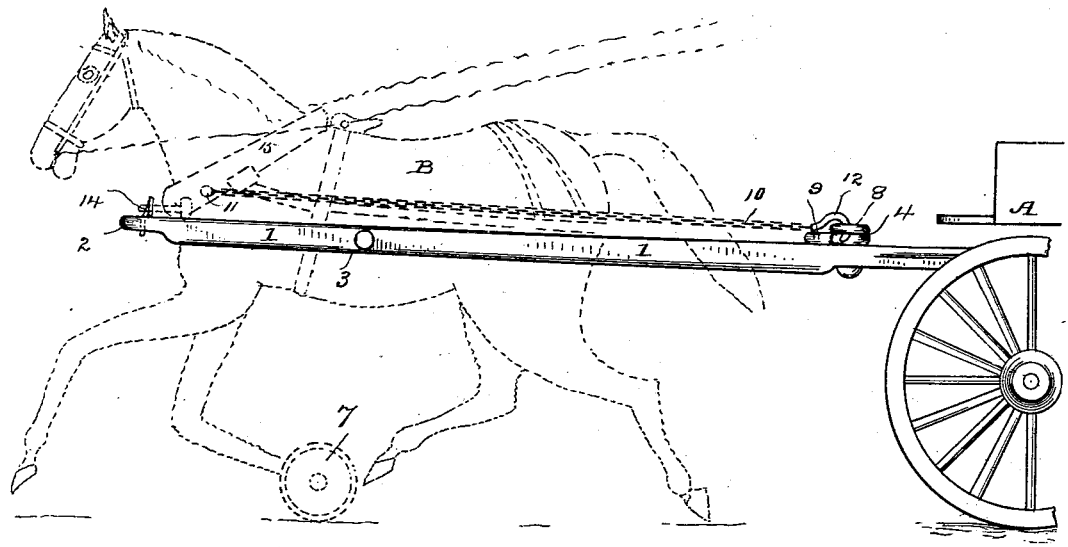

Figure 1 is a plan view of my novel toy, the horses being dotted, so as to indicate more clearly the method of hitching up; and Fig. 2 is a side elevation.

A denotes a vehicle, which may be a wagon, fire-engine, hose-cart, or any other toy vehicle, or a number of vehicles may be used alternately, and B denotes draft-animals.

1 denotes the pole of the vehicle, which is provided with a cross-piece 3, which may be formed integral therewith, at its front end with an eye or ring 2, and near its rear end with an evener 4. This evener is provided at its outer ends with eyes 8 and near the pole with eyes 9. The toy draft-animals are provided with holes 6, through which the respective ends of the cross-piece are passed, as clearly shown in Fig. 1. The animals are preferably provided with one or more wheels 7, upon which they rest.

10 denotes traces, which may be chains or cords. The forward ends of these traces are attached to studs 11, which extend outward from the toy draft-animals. In the present instance they are shown as extending from collars 15 on the animals. The rear ends of the traces are provided with hooks 12, which engage the eyes on the evener, the traces connected to each draft-animal engaging, respectively, an eye 8 and an eye 9 on the evener. At the front ends of the toy animals are hooks 14, which are loosely connected thereto and are adapted to engage eye 2 at the end of the pole. Chains having hooks at their ends may of course be substituted for hooks 14, if preferred.

To unhitch the team, it is simply necessary to detach hooks 14 from the eye in the pole and to detach hooks 12 from eyes 8 and 9. Each of the animals may then be removed from the vehicle by simply sliding it off from the cross-piece, the traces and hooks 14 remaining with the draft-animals and being removed with them in the same manner that horses and harness are ordinarily removed from a vehicle. To attach the animals to the vehicle again, it is simply necessary to place the animals in position on opposite sides of the pole, the respective ends of the cross-piece passing through them, and then to connect hooks 12 with eyes 8 and 9 on the evener and hooks 14 with the eye at the end of the pole.

Having thus described my invention, I claim—

1. In a toy, the combination with a vehicle-pole having a cross-piece and having an eye at the front end, of toy draft-animals having openings through which the ends of the cross-piece are passed, and hooks for attaching the front ends of the animals to the end of the pole, to prevent lateral movement, and hold the animals on said cross-piece.

2. In a toy, the combination with a vehicle-pole having a cross-piece, and an eye at its forward end, and an evener near the rear end of the pole which is provided with eyes 8 and 9, of toy draft-animals having openings through which the cross-piece is passed and a hook 14 extending laterally from each animal and engaging the eye on the pole and preventing lateral movement of the animals on the cross-piece and traces 10 attached to collars on the draft-animals and to the eyes on the evener.

In testimony whereof I affix my signature in presence of two witnesses.

HARRY C. IVES.

Witnesses:
A. M. WOOSTER,
S. V. RICHARDSON.